United States Patent [19]
Watanabe et al.

[11] Patent Number: 5,835,136
[45] Date of Patent: Nov. 10, 1998

[54] ELECTRONIC PRINTER CAMERA

[75] Inventors: Kenji Watanabe, Tokyo; Masayuki Takayama, Shiojiri, both of Japan

[73] Assignee: King Jim Co., Ltd., Tokyo, Japan

[21] Appl. No.: 934,444

[22] PCT Filed: Mar. 12, 1991

[86] PCT No.: PCT/JP91/00335

§ 371 Date: Oct. 23, 1992

§ 102(e) Date: Oct. 23, 1992

[87] PCT Pub. No.: WO91/14336

PCT Pub. Date: Sep. 19, 1991

[30] Foreign Application Priority Data

Mar. 12, 1990 [JP] Japan .......................... 2-60293

[51] Int. Cl.$^6$ ............................................... H04N 5/225
[52] U.S. Cl. ................................... 348/207; 348/231
[58] Field of Search ................................ 358/209, 909, 358/400, 471, 482, 335, 296, 451; 348/207, 220, 221, 231, 333; 395/102, 109; 382/298, 299; H04N 5/225, 5/30

[56] References Cited

U.S. PATENT DOCUMENTS 4,074,324  2/1978  Barrett ................................... 358/296
4,903,132  2/1990  Yamawaki ............................... 358/209
5,093,730  3/1992  Ishii et al. ............................. 358/296

*Primary Examiner*—Andrew Faile
*Assistant Examiner*—Taun V. Ho
*Attorney, Agent, or Firm*—Young & Thompson

[57] ABSTRACT

An electronic printing camera in which an optical image of an object obtained with a taking lens is converted to an electrical signal by a solid-state image sensor and to an image signal by an analog processing circuit, the obtained image signal is converted to a digital image data by an A/D converter, the digital image data is thereafter stored in a RAM, and an image is printed out by a printer according to the stored data, characterized in that image processing programs for processing the digital image data stored in the RAM in different ways and for printing out them by a printer are stored in a memory means beforehand, one of the picture processing programs is selected with a plurality of button switches and the digital image data stored in the RAM is outputted to a printer according to the selected image processing program to control the printer. By selecting the program which outputs the digital image data stored in the RAM as a monitor image corresponding to the object image to a printer by the operation of a shutter button switch, a monitor print can be obtained immediately after taking an object.

2 Claims, 3 Drawing Sheets

ELECTRONIC PRINTER CAMERA

TECHNICAL FIELD

This invention relates to an electronic camera. In particular, it relates to an electronic printing camera in which an optical image of an object is obtained through an optical lens and converted into an electrical signal to be output for printing by a thermal printer.

BACKGROUND ART

Conventionally, an electronic camera of this kind has been proposed in that an optical image obtained through an optical lens from an object to be picked up is converted into an electrical signal, after which an editing process such as an enlargement, contraction of the resultant image is suitably carried out, followed by reproduction of the image on a display by an electronic view finder and printing of the image by a printer (Japanese Patent Application Laid Open No. 189785 in 1986).

As prior arts, polaroid cameras and the like are well known as means for instantaneously printing the object image obtained through the optical lens. However upon printing with such a camera, the use of thermosensible papers (thermal papers) with a special photosensitive material provides the increase of a printing cost. It is difficult for the camera to store and reprint the image. Further, it is impossible to perform the editing processes such as enlargement, contraction, and trimming of the images.

With the foregoing background, proposed was an electric camera which is so constructed that the optical image is converted into the electrical signal, after which the editing process such as enlargement, contraction is suitably carried out followed by reproduction of the resultant image by the electronic view finder and printing the image by the printer.

The above conventional electronic camera may convert the optical image of the object into the electric signal, which must however be reproduced on the display as the image, the contents of which are thereafter printed by the printer. Accordingly, the electronic view finder for reproducing the image on the display and a control circuit for controlling the above finder or display are required. This, however, necessitates the same procedure as in the conventional photography thereby resulting in the increased cost for the electronic camera and a longer time for taking a photograph.

DISCLOSURE OF THE INVENTION

An object of the invention is to provide an electronic camera wherein an optical image of an object obtained through an image pick-up lens is converted into an electrical signal, which is temporarily stored as digital image data and simultaneously printed out as a predetermined simple monitor-image, followed by ascertaining the picked-up image, after which the image data stored is subjected to processes such as the enlargement, contraction, trimming, or conversion between positive and negative, so that the images may repeatedly be printed in various forms upon any requirements thereby preventing a confirmation of the image contents by use of such an electronic view finder in the prior art and permitting the simplified and rapid multilateral printing performance of the image to be realized with a lower cost.

An electronic printing camera according to the invention in which an optical image of an object obtained through an image pick-up lens is converted into an electric signal by a solid-state image pick-up element sensor and further converted into an image signal by an analog processing circuit, the image signal obtained is converted into digital image data by an A/D converter followed by storing in a RAM, thereafter the digital image data is outputted to a printer for printing performance, is characterized in that the electronic printing camera is provided with a storage means being set therein with various kinds of image processing programs which process the digital image data stored in the RAM in various ways and respectively output to the printer, a plurality of pushbutton switches for selecting the image processing programs set in the storage means, and a control means for controllably driving the printer by outputting to the printer the digital image data stored in the RAM according to a selected image processing program.

In this case, a thermal printer which prints by a reaction of a thermosensible (thermal) paper is available.

Further, the control means may comprise a CPU which is so constructed that a reading-out of a predetermined image processing program is performed by a selecting operation of the pushbutton switches from a ROM in which the image processing programs are set, by which the digital image data stored in the RAM are processed and output to the printer for printing a predetermined image.

Furthermore, a monitor image processing program is set so that the digital image data stored in the RAM as an image processing program is outputted to the printer as a monitor image corresponding to the object image, provided is a shutter pushbutton switch which is set so that the monitor image processing program is executed at the same time of the photograph taking of the object.

BEST MODE FOR CARRYING OUT THE INVENTION

The embodiments of electronic printing cameras according to the invention will hereinafter be described in detail with reference to the accompanying drawings.

Figure 1:
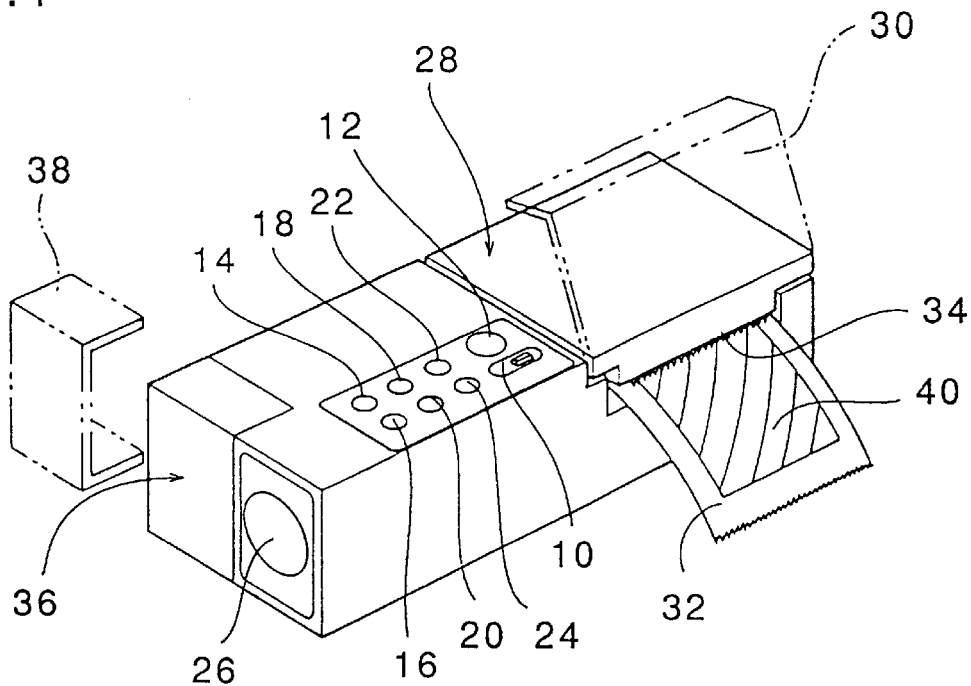
FIG. 1 is a schematic perspective view showing an embodiment of an electronic printing camera according to the invention.

FIG. 1 is a schematic perspective view showing an embodiment of the electronic printing camera according to the invention. In FIG. 1, reference numeral 10 depicts a power supply switch, 12 a shutter pushbutton switch, 14 a printing pushbutton switch, 16, 18, 20, 22 and 24 various kinds of image processing pushbutton switches, 26 an image pick-up lens, 28 a print paper container, 30 an open and close cover for exchanging papers, 32 a print paper, 34 a cutter, 36 a battery container, and 38 an open and close cover for exchanging the batteries. In such an electronic printing camera of this embodiment, the battery is contained in the battery container 36 for obtaining a predetermined power supply and the print paper such as a thermosensible paper (thermal paper) is stored in the print paper container 28, after which the power switch 10 turns ON. The image pick-up lens 26 is directed to the object prior to a push of the shutter pushbutton switch 12, immediately followed by pushing the printing pushbutton switch 14. As a result of those, the print paper 32 printed therein with a predetermined object image 40 is fed out from a side surface of the print paper container 28. In this manner, the object image once picked-up may temporarily be stored, from which the image transformed upon a requirement may be reproduced by operating any of the various kinds of image processing pushbutton switches 16 to 24.

Figure 2:
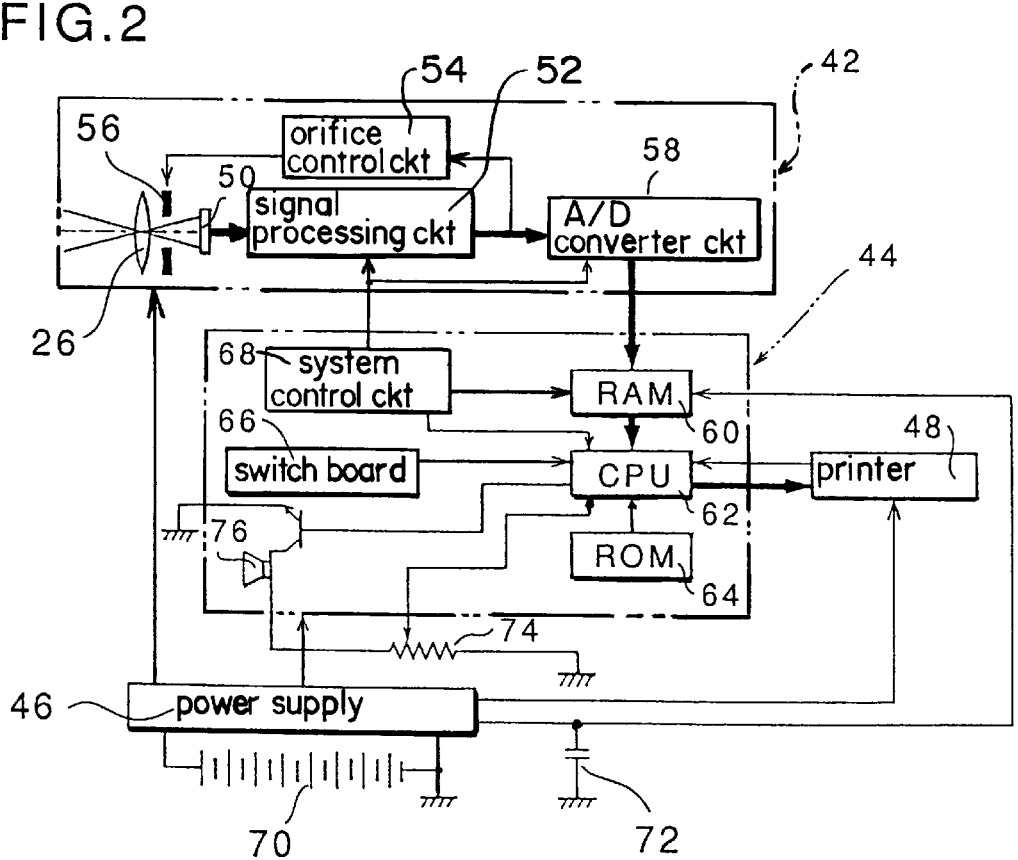
FIG. 2 is a block diagram showing an inside construction and an image processing system of an electronic printing camera according to the invention.

Next, an inner construction of the electronic printing camera of the embodiment will be described. FIG. 2 illustrates an embodiment of the electronic circuit of the electronic printing camera, which basically comprises an analog signal processing block 42, a digital signal processing block 44, a power supply circuit 46 and a printer 48.

The analog signal processing block 42 is provided with a solid-state image pick-up element sensor 50. The optical images of the object obtained by the image pick-up lens 26 is input and each of picture elements thereof is converted into the electrical signal, followed by output as image signals through an analog signal processing circuit 52. For this solid-state image pick-up element, in general, a MOS type element or a CCD element is used to form an image for one picture upon the data formed of, for example, 244×244 picture elements. Based on such image signals, an orifice control circuit 54 adjusts an automatic orifice mechanism 56 provided for the image pick-up lens 26 thereby performing a suitable orifice adjustment of the optical image formed on the solid-state image pick-up element sensor 50. The image signals are converted by an A/D converter circuit 58 into digital signals, for example, 4 bit signals.

The digital signal processing block 44 is provided with a static RAM 60 for storing the image signals converted into the digital signals by the A/D conversion circuit 58, this static RAM 60 has a capacity of 256 kilobits, which is capable of storing data corresponding to an entire picture of the solid-state image pick-up element sensor 50 formed of, for example, 244×244 picture elements. The image data stored in the RAM 60 are outputted by the printer 48 in accordance with a program previously set in an ROM 64 through a CPU 62. Programs for following various kinds of image processes are set in the ROM 64, by which the image data stored in the RAM 60 through the CPU 62 is suitably processed and is outputted from the printer 48 by a selective signal from a switch board 66 including the various kinds of image processing pushbutton switches 16, 18, 20, 22 and 24. The digital signal processing block 44 is provided with a system control circuit 68, which outputs a predetermined read-out timing signal to fetch data of each picture element from the solid-state image pick-up element sensor 50. Concurrently, an A/D conversion from these resultant data into the digital image data is accomplished, a write timing signal is output to write, or store the digital image data into the RAM 60. The power supply circuit 46 is provided therein with a battery 70 which generates a voltage, for example, 12 V, thereby supplying 9 V for controllably driving the analog signal processing block 42, 5 V for controllably driving the digital signal processing block 44, 6 V for driving the printer 48, and 3 V for holding a memory operation of the RAM 60. The power supply circuit for the RAM 60 is so constructed that a memory backup voltage required for storing the above memory operation may be generated even when the switch 10 is OFF. Further, a capacitor 72 is provided to serve as a memory back up means on a power failure during the time of exchanging the batteries.

Reference numeral 74 depicts a variable resistor which selects a pulse width to be outputted to the printer 48 thereby adjusting light and shade of the printed picture. Reference numeral 76 depicts a buzzer which generates an operating sound when a pushbutton switch is operated or an alarm on an abnormal state arisen in the printer.

An operation of the circuit based on a basical operation of the electronic printing camera of the embodiment in the foregoing construction will now be described. When the power supply switch 10 turns ON, the power supply circuit 46 generates voltages of 9 V and 5 V supplied to the analog signal processing block 42 and the digital signal processing block 44 respectively, so that each of the blocks 44 and 46 starts. For the solid-state image pick-up element sensor 50, the picture element data of 244×244 are sequentially read out at the timing of intervals of $\frac{1}{60}$ seconds, and converted into the image signals by the analog signal processing circuit 52. This image signals are converted into the digital image data of 4 bits by the A/D conversion circuit 58. At this time, the orifice control circuit 54 controls an amount of orifice of the automatic orifice mechanism 56 so that an average value of the image signals remains within a constant level. These operations are repeated at a period of $\frac{1}{60}$ seconds until any of following stop operations is performed 1. in the case that an operation of the power supply circuit 46 is stopped when the power supply switch 10 turns OFF.
2. in the case that the CPU 62 permits the power supply circuit 46 to automatically be interrupted after about two minutes from the last control or operation.
3. in the case that a voltage of 9 V which has been applied to the analog signal processing block 42 is interrupted during operation of the printer 48.

When the shutter pushbutton switch 12 is operated, the digital image data corresponding to the object image on an entire picture of the solid-state image pick-up element sensor 50 are written and stored into the RAM 60. Subsequently, the contents of the digital image data written into the RAM 60 are outputted from the printer 48 as a monitor image. After confirmation of the monitor image outputted, the printing pushbutton switch 14 is operated. As a result of those, the contents of the digital image data written into the RAM 60 are outputted from the printer 48 in accordance with the image processing program set in the ROM 64. When an output operation of the printer 48 is completed, a voltage supplied to the printer 48 is taken from 6 V to 0 V. When the pushbutton switch 16 is operated upon taking a photograph of the object, a backlight compensation signal is output to the orifice control circuit 54 thereby permitting the amount of orifice of the automatic orifice mechanism 56 to be larger than the normal amount thereof. Accordingly, the operation of the shutter pushbutton switch 12 with pushing the pushbutton switch 16 permits the object image subjected to the backlight compensation to be written into the RAM 60.

The operation of the printer 48 may be stopped, when signals indicating abnormal states of the printer 48, which include detecting signals indicating "no-supply of paper", "open state" of the open and close cover 30 for exchanging the paper, and "over-heat" (more than about 57° C.) of a thermal head.

Whereas constitutions and operations of the electronic printing camera has essentially been described, the invention is characterized in a process of the print images and a method of operating which will hereinafter be described.

The electronic printing camera according to the invention is so constructed that two kinds of gradations (modulations) expressions of the print output images may be selected. This invention may employ a dot area modulation method illustrated in FIG. 3 or a cumulative modulation method illustrated in FIG. 4.

Figure 3:
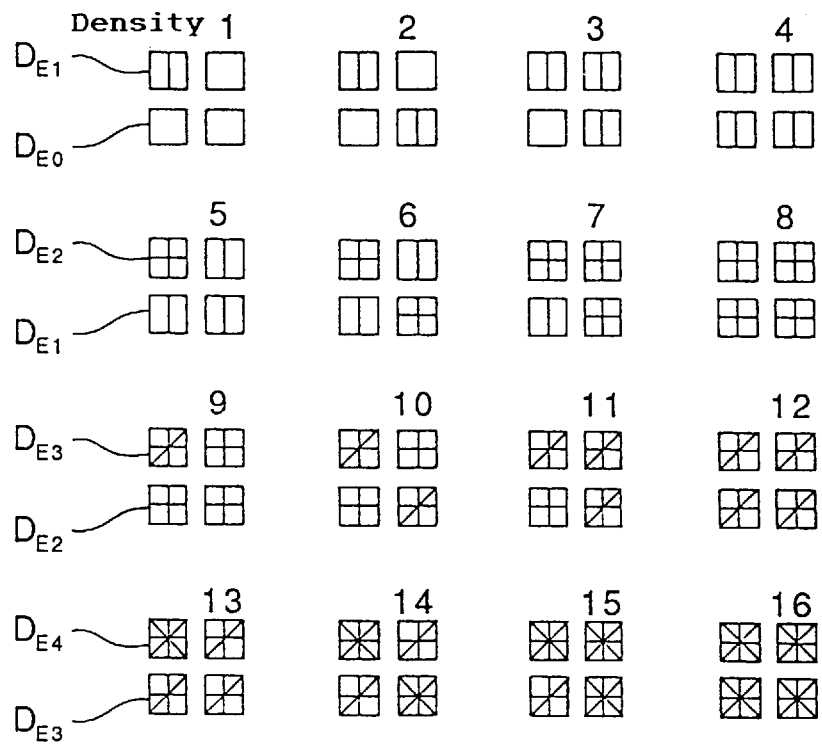
FIG. 3 is an illustrative view showing a dot area modulation (gradation) system of an embodiment of a print system in an electronic printing camera according to the invention.

In the dot area modulation method shown in FIG. 3, densities 1 to 16 are set. One picture element is formed of 4 dots in which the current-carrying times for each dot and an arrangement thereof are variable. For example, density 1 is formed of one dot DE1 of one time of current-carrying and three dots DEO of no-carrying-current, it is a whitest picture element. Up to density 4, the number of the dots DE1 of one time of current-carrying increase by one. Density 5 is formed of one dot DE2 of two times of current-carrying and the three dots DE1 of one time of current-carrying. Up to density 8, the number of the dots DE2 of two times of current-carrying increase by one. Density 9 is formed of the one dot DE3 of three times of current-carrying and the three dots DE2 of two times of current-carrying. Up to density 12, the number of the dots DE3 of three times of current-carrying increase by one. Density 13 is formed of one dot DE4 of four times of current-carrying and the three dots DE3 of three times of current-carrying. Up to density 16, the number of the dots DE4 of four times of current-carrying increase by one. Density 16 is expressed by a blackest picture element.

The dot DE1 of one time of current-carrying is displayed by coloring using only about a ¼ picture printing energy of saturation coloring of the thermosensible paper as a print paper and expressed by ¼ blackness of the saturation coloring. The dot DE2 of two times of current-carrying is expressed by the double of the dots DE1 of one time of current-carrying. The dot DE3 of three times of current-carrying is expressed by the triple of the dots DE1 of one time of current-carrying. The dot DE4 of four times of current-carrying is expressed by the four-stored dots DE1 of one time of current-carrying. Therefore, the dot area modulation method has an advantage of a short printing time due to the less current-carrying times.

Figure 4:
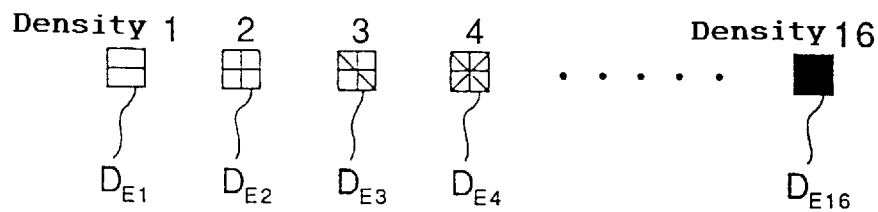
FIG. 4 is an illustrative view showing a cumulative modulation (gradation) system of another embodiment of a print system in any electronic printing camera according to the invention.

In the cumulative modulation method shown in FIG. 4, current-carrying times in the range from 1 to 16 are used for each dot to express densities 1 to 16. Accordingly, density 1 is formed of a dot of one time of current-carrying, it is expressed by coloring using about ¹⁄₁₆ energy of the picture printing energy for saturation coloring of the thermosensible paper, and shown by about ¹⁄₁₆ blackness of the saturation coloring. Similarly the display of the picture elements by the cumulative modulation method are achieved by sequentially laminating the dot of one time of current-carrying from density 2 to density 16. In case of the cumulative modulation method, a fine printing may be obtained but an extended printing time.

A format of the print image to the print paper 32 in the electronic printing camera according to the invention will be described with reference to FIG. 5.

According to the invention, three kinds of formats of the print images are set on print papers 32.

1. Monitor Image (Image A)

The monitor image is an image for a monitor outputted upon operating the shutter pushbutton switch 12 having 112×143 dots and an image size of 14 mm×19 mm. For density in this case, dots of densities 1 and 2 in case of the cumulative gradation (modulation) are set at density 2, similarly dots of densities 3 and 4 are set at density 4, in the same manner the following densities of eight cumulative gradations (modulations) are set as a whole for printing.

2. Entire Image (Image B)

The entire image is an image of the entire object, which is output by pushing the printing pushbutton switch 14 after printing the image used for monitoring. The image has dots of 448×570 and an image size of 56 mm×76 mm. For the density, as in the above monitor image, the densities of eight cumulative gradations (modulations) are set as a whole for printing. In this format, the printing may also be performed by using the dot area gradation (modulation).

3. Mini-Image (Image C)

The mini-image is an image formed of a quarter of the above entire image which is output by pushing the pushbutton switch 14 after pushing the printing pushbutton switch 14 with pushing the pushbutton switch 24. The image has 224×285 dots and an image size of 28 mm×38 mm. Similarly as in the above, the densities of eight cumulative gradations (modulations) may be set as a whole for printing or the printing may also be performed by using the dot area gradation (modulation).

In the respective images of the print papers 32, an outline 80 is formed of rows of dots and expressed by an intermediate gradation (modulation) of density 8 of the cumulative gradation (modulation). A blank portion opposite to the image is expressed by square ruled dots 82 formed of dots, each of which is arranged in vertical and horizontal directions at even dot interval of 4 mm. The square ruled dots 82 are also expressed by the intermediate gradation (modulation) of the density 8 of the cumulative gradation (modulation) as in the outline 80.

Figure 5:
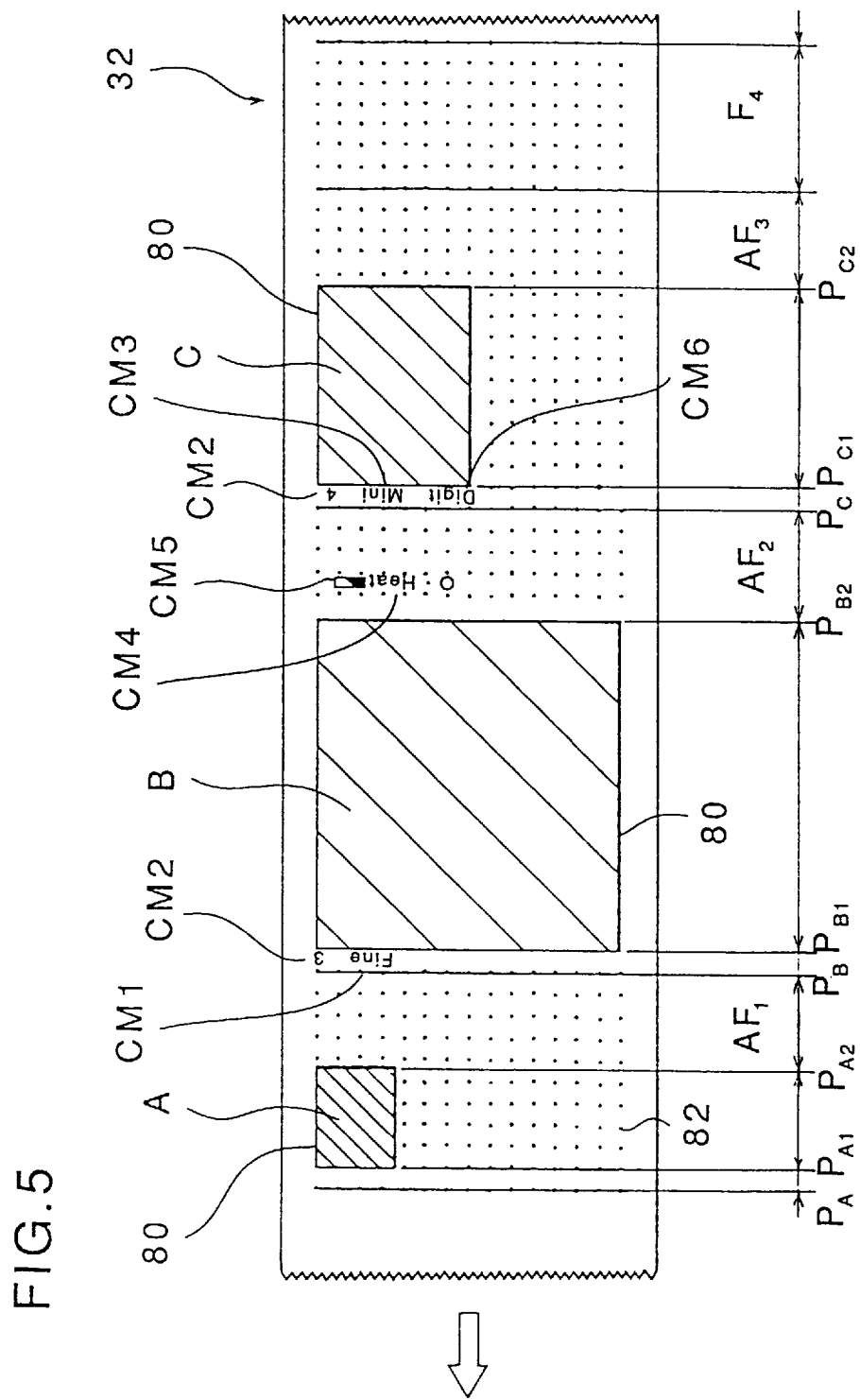
FIG. 5 is an illustrative view showing a format of an output image printed in a print paper in the electronic printing camera according to the invention.

In FIG. 5, an arrow mark indicates a feed direction of the print paper 32, symbols PA, PB and PC represent printing operation start positions for print images A, B and C respectively, PA1 to PA2, PB1 to PB2, and PC1 to PC2 represent positions from start to end of the printing operation with respect to the object images of the printing images A, B, and C respectively. AF1, AF2, and AF3 represent automatic feed lengths after the end of the printing. F4 represents a feed length of the print paper 32 in case that the pushbutton switch 18 continues pushing.

In FIG. 5, CM1 depicts a cumulative gradation (modulation) comment, for example, which is represented by "Fine". In case of the dot area gradation (modulation), no representation is given. CM2 represents a print picture sheet-number comment, which represents the number of sheets by the series number. A display function of the CM2 is set when the power supply switch 10 turns ON with pushing the pushbutton switch 22, whereby displaying the numerals of 1 to 99. Once again, when the power supply switch 10 turns ON with pushing the pushbutton switch 22, the display function of the CM2 is released and no display is accomplished. CM3 is the mini-image comment and, for example, expressed by "Mini". CM4 is a heat alarm comment, for example, displayed as "O. Heat" when a head of the thermal printer is overheated and has a higher temperature, and the print output thereafter maintains stop until the head temperature falls up to a certain extent. CM5 is a battery life indicator for indicating a reduction of a charged capacity of the battery. Further, the CM 5 is so set as to indicate when the charged capacity of the battery falls up to an extent of an inability to guarantee an image quality of the printed output. CM6 is an image processing comment, and eight kinds of image processing comments are set as follows.

| CM6 Image Process Comment | Contents of Image Process | Operation of Image Process indication Pushbutton switch |
|---|---|---|
| Digit | Sixteen gradations are converted into two gradations of white and black for printing. | Push switch 14 with pushing switch 22. |
| HiCon | Print with enhancement of white and black | Push switch 18 with pushing switch 22. |
| Print | Sixteen gradations are converted into four gradations for printing. | Push switch 20 with pushing switch 22. |
| Nega | White and black of gradation are inverted for printing. | Push switch 24 with pushing switch 22. |
| Zoom | Center area is enlarged (the double of area ratio) and vertical and horizontal directions are converted for printing. | Push switch 24. |
| ZoomR | Right side area of center line is enlarged (the double of area ratio), and vertical and horizontal directions are converted for printing. | Push switch 18 with pushing switch 24. |
| ZoomL | Left side area of center line is enlarged (the double of area ratio), and vertical and horizontal directions are converted for printing. | Push switch 20 with pushing switch 24. |
| O - Line | Outline of object image is printed. | Push switch 22 with pushing switch 24. |

An image processing program set in the ROM 64 is selected by an operation of the pushbutton switches 14, 18, 20, 22, and 24 as shown in Table 1, thereafter by selecting the gradation (modulation) method and operating the pushbutton switch 14, the digital image data of RAM 60 is image-processed and printed out on the print paper together with the image processing comment CM6.

When the pushbutton switch 20 is pushed during the printing output, the printing output is stopped and a self-feeding of the print paper is performed and then a printer operation is stopped. When the pushbutton switch 20 is operated except the printing outputted, the image processing indication contents as previously set are released.

Further, according to the invention, an operational sound may be generated by a buzzer upon the operations of the pushbutton switches, the operation sound may be stopped when the power supply switch 10 turns ON with pushing the pushbutton switch 20. The operation sound by the buzzer may again be generated, when the power supply switch 10 turns ON with pushing the pushbutton switch 20.

From the embodiment hereinbefore described, the electronic printing camera according to the invention permits the monitor image to be printed out on the print paper to check a photograph, immediately after operating the shutter pushbutton switch 12 with the image pick-up lens directed to the object. For this reason, while in the conventional camera the photograph of the object is taken at the same time of checking through the finder followed by the image output, the electronic printing camera according to the invention permits the object image to be checked immediately after taking the photograph. As a result of those, the unsuitable or malfunctional photograph taking is determined, after which the processes are made in various ways for the desirous images followed by printing out on the print papers.

Further, the electronic printing camera according to the invention permits the object image confirmed by the monitor image to be processed into various images predetermined by computer processing followed by printing. Accordingly, it permits not only object images to fidelity be reappeared as the conventional camera but also a wider utilization for various object images and as visual data for various businesses.

Still further, the electronic printing camera according to the invention requires no finder mechanism which is necessary for the conventional camera thereby permitting a whole structure to be minimized to have portability as well as a low cost fabrication.

We claim:

1. In an electronic printing camera in which an optical image of an object obtained through an image pick-up lens is converted into an electric signal by a solid-state image pick-up element sensor and further converted into an image signal by an analog processing circuit, after which the image signal is converted into digital image data by an A/D converter followed by storing the digital image data in a RAM, thereafter the digital image data is outputted to a printer for printing; the improvement wherein the electronic printing camera further comprises:

a storage means for storing image processing programs which process each of the digital image data stored in the RAM and output the processed digital image data to the printer;

a plurality of pushbutton switches for selecting the image processing programs stored in the storage means; and a control means for controllably driving the printer by outputting to the printer the digital image data stored in the RAM according to a selected image processing program; whereby any of the pushbutton switches is adapted to set a monitor image processing program by which the digital image data stored in the RAM as an image processing program is outputted to the printer as a monitor image corresponding to the object image, and to execute the monitor image processing program at the same time of taking a photograph of the object, said control means including a CPU adapted to read a predetermined image processing program from a ROM storing a variety of image processing programs by a selecting operation of the pushbutton switches, and means for processing the digital image data stored in the RAM and outputted to the printer so as to print a predetermined image having one of the three following characteristics:

a) 112×143 dots and a size of 14 mm×19 mm;
   b) 448×570 dots and a size of 56 mm×76 mm; or
   c) 224×285 dots and a size of 28 mm×38 mm.

2. An electronic printing camera as claimed in claim 1, wherein the printer comprises a thermal printer which prints by reaction of a thermosensible paper.

* * * * *